United States Patent
Huang et al.

(10) Patent No.: US 12,167,315 B2
(45) Date of Patent: Dec. 10, 2024

(54) RELAY SELECTION FOR COOPERATIVE RELAYING

(71) Applicant: QUALCOMM Incorporated, San Diego, CA (US)

(72) Inventors: Yi Huang, San Diego, CA (US); Seyedkianoush Hosseini, San Diego, CA (US); Wei Yang, San Diego, CA (US); Peter Gaal, San Diego, CA (US); Wanshi Chen, San Diego, CA (US); Tingfang Ji, San Diego, CA (US); Ahmed Elshafie, San Diego, CA (US); Yisheng Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/334,503

(22) Filed: Jun. 14, 2023

(65) Prior Publication Data

US 2023/0328626 A1 Oct. 12, 2023

Related U.S. Application Data

(62) Division of application No. 17/249,226, filed on Feb. 24, 2021, now Pat. No. 11,711,742.

(51) Int. Cl.
*H04B 7/155* (2006.01)
*H04B 17/345* (2015.01)
(Continued)

(52) U.S. Cl.
CPC ........ *H04W 40/22* (2013.01); *H04B 7/15528* (2013.01); *H04B 7/15592* (2013.01);
(Continued)

(58) Field of Classification Search
CPC .... H04B 7/02–17; H04B 17/0082–409; H04L 5/0001–0098; H04W 4/30–48;
(Continued)

(56) References Cited

U.S. PATENT DOCUMENTS

| 10,149,225 | B1 | 12/2018 | Oroskar et al. |
| 2018/0139694 | A1* | 5/2018 | Folke .................... H04W 40/22 |

(Continued)

FOREIGN PATENT DOCUMENTS

JP 3222349 B2 10/2001

*Primary Examiner* — Timothy J Weidner
(74) *Attorney, Agent, or Firm* — Harrity & Harrity LLP/Qualcomm Incorporated

(57) ABSTRACT

Various aspects of the present disclosure generally relate to wireless communication. A source user equipment (UE) may transmit, to a relay UE, information identifying that the relay UE is one of a plurality of relay UEs selected for cooperative relaying of a communication from the source UE to a destination UE. A channel between the source UE and the relay UE may be one of a plurality of channels comprising a channel between the source UE and each relay UE of the plurality of relay UEs. The plurality of relay UEs may be selected based at least in part on a degree of correlation of the channel between the source UE and the relay UE with at least one other channel of the plurality of channels. The UE may transmit the communication to the plurality of relay UEs for cooperative relaying to the destination UE. Numerous other aspects are described.

30 Claims, 11 Drawing Sheets

(51) Int. Cl.
*H04B 17/40* (2015.01)
*H04W 24/08* (2009.01)
*H04W 24/10* (2009.01)
*H04W 40/12* (2009.01)
*H04W 40/22* (2009.01)
*H04W 72/0453* (2023.01)
*H04W 72/25* (2023.01)
*H04W 84/04* (2009.01)
*H04W 84/18* (2009.01)
*H04W 88/04* (2009.01)
*H04W 92/02* (2009.01)
*H04W 92/18* (2009.01)

(52) U.S. Cl.
CPC ........... *H04B 17/345* (2015.01); *H04B 17/40* (2015.01); *H04W 24/08* (2013.01); *H04W 24/10* (2013.01); *H04W 40/12* (2013.01); *H04W 72/0453* (2013.01); *H04W 72/25* (2023.01); *H04W 84/047* (2013.01); *H04W 84/18* (2013.01); *H04W 88/04* (2013.01); *H04W 92/02* (2013.01); *H04W 92/18* (2013.01)

(58) Field of Classification Search
CPC ..... H04W 8/22–245; H04W 24/02–10; H04W 28/02–26; H04W 36/0005–385; H04W 40/005–38; H04W 48/02–20; H04W 72/02–569; H04W 74/002–0891; H04W 76/10–50; H04W 84/005–22; H04W 88/005–188; H04W 92/02–24
See application file for complete search history.

(56) References Cited

U.S. PATENT DOCUMENTS

| | | |
|---|---|---|
| 2018/0206140 A1 | 7/2018 | Panteleev et al. |
| 2020/0154336 A1* | 5/2020 | Islam .................. H04W 40/22 |
| 2021/0266062 A1 | 8/2021 | Goto et al. |
| 2022/0272602 A1 | 8/2022 | Huang et al. |

* cited by examiner

RELAY SELECTION FOR COOPERATIVE RELAYING

RELATED APPLICATION

This application is a divisional of U.S. patent application Ser. No. 17/249,226, filed Feb. 24, 2021, which is incorporated herein by reference in its entirety.

FIELD OF THE DISCLOSURE

Aspects of the present disclosure generally relate to wireless communication and to techniques and apparatuses for relay selection for cooperative relaying.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a source user equipment (UE) for wireless communication includes a memory and one or more processors operatively coupled to the memory, the memory and the one or more processors configured to: transmit, to a relay UE, information identifying that the relay UE is one of a plurality of relay UEs selected for cooperative relaying of a communication from the source UE to a destination UE, wherein a channel between the source UE and the relay UE is one of a plurality of channels comprising a channel between the source UE and each relay UE of the plurality of relay UEs, and the plurality of relay UEs are selected based at least in part on a degree of correlation of the channel between the source UE and the relay UE with at least one other channel of the plurality of channels; and transmit the communication to the plurality of relay UEs for cooperative relaying to the destination UE.

In some aspects, a base station for wireless communication includes a memory and one or more processors operatively coupled to the memory, the memory and the one or more processors configured to: receive, from a source UE, a first report indicating at least one of a signal strength measurement or a channel estimate; receive, from a relay UE, a second report indicating at least one of a signal strength measurement or a channel estimate; and transmit, to the source UE and based at least in part on the first report and the second report, information identifying that the relay UE is one of a plurality of relay UEs selected for cooperative relaying of a communication from the source UE to a destination node, wherein a channel between the source UE and the relay UE is one of a first plurality of channels comprising a channel between the source UE and each relay UE of the plurality of relay UEs, and a channel between the relay UE and the destination node is one of a second plurality of channels comprising a channel between each relay UE of the plurality of relay UEs and the destination node, and the plurality of relay UEs are selected based at least in part on at least one of a degree of correlation of the channel between the source UE and the relay UE with at least one other channel of the first plurality of channels or a degree of correlation of the channel between the relay UE and the destination node with at least one other channel of the second plurality of channels.

In some aspects, a method of wireless communication performed by a source UE includes transmitting, to a relay UE, information identifying that the relay UE is one of a plurality of relay UEs selected for cooperative relaying of a communication from the source UE to a destination UE, wherein a channel between the source UE and the relay UE is one of a plurality of channels comprising a channel between the source UE and each relay UE of the plurality of relay UEs, and the plurality of relay UEs are selected based at least in part on a degree of correlation of the channel between the source UE and the relay UE with at least one other channel of the plurality of channels; and transmitting the communication to the plurality of relay UEs for cooperative relaying to the destination UE.

In some aspects, a method of wireless communication performed by a base station includes receiving, from a source UE, a first report indicating at least one of a signal strength measurement or a channel estimate; receiving, from a relay UE, a second report indicating at least one of a signal strength measurement or a channel estimate; and transmitting, to the source UE and based at least in part on the first report and the second report, information identifying that the relay UE is one of a plurality of relay UEs selected for cooperative relaying of a communication from the source UE to a destination node, wherein a channel between the source UE and the relay UE is one of a first plurality of channels comprising a channel between the source UE and each relay UE of the plurality of relay UEs, and a channel between the relay UE and the destination node is one of a second plurality of channels comprising a channel between each relay UE of the plurality of relay UEs and the destination node, and the plurality of relay UEs are selected based at least in part on at least one of a degree of correlation of the channel between the source UE and the relay UE with at least one other channel of the first plurality of channels or a degree of correlation of the channel between the relay UE and the destination node with at least one other channel of the second plurality of channels.

In some aspects, a non-transitory computer-readable medium storing a set of instructions for wireless communication includes one or more instructions that, when executed by one or more processors of a source UE, cause the source UE to: transmit, to a relay UE, information identifying that the relay UE is one of a plurality of relay UEs selected for cooperative relaying of a communication from the source UE to a destination UE, wherein a channel between the source UE and the relay UE is one of a plurality of channels comprising a channel between the source UE and each relay UE of the plurality of relay UEs, and the plurality of relay UEs are selected based at least in part on a degree of correlation of the channel between the source UE and the relay UE with at least one other channel of the plurality of channels; and transmit the communication to the plurality of relay UEs for cooperative relaying to the destination UE.

In some aspects, a non-transitory computer-readable medium storing a set of instructions for wireless communication includes one or more instructions that, when executed by one or more processors of a base station, cause the base station to: receive, from a source UE, a first report indicating at least one of a signal strength measurement or a channel estimate; receive, from a relay UE, a second report indicating at least one of a signal strength measurement or a channel estimate; and transmit, to the source UE and based at least in part on the first report and the second report, information identifying that the relay UE is one of a plurality of relay UEs selected for cooperative relaying of a communication from the source UE to a destination node, wherein a channel between the source UE and the relay UE is one of a first plurality of channels comprising a channel between the source UE and each relay UE of the plurality of relay UEs, and a channel between the relay UE and the destination node is one of a second plurality of channels comprising a channel between each relay UE of the plurality of relay UEs and the destination node, and the plurality of relay UEs are selected based at least in part on at least one of a degree of correlation of the channel between the source UE and the relay UE with at least one other channel of the first plurality of channels or a degree of correlation of the channel between the relay UE and the destination node with at least one other channel of the second plurality of channels.

In some aspects, an apparatus for wireless communication includes means for transmitting, to a relay UE, information identifying that the relay UE is one of a plurality of relay UEs selected for cooperative relaying of a communication from the apparatus to a destination UE, wherein a channel between the apparatus and the relay UE is one of a plurality of channels comprising a channel between the apparatus and each relay UE of the plurality of relay UEs, and the plurality of relay UEs are selected based at least in part on a degree of correlation of the channel between the apparatus and the relay UE with at least one other channel of the plurality of channels; and means for transmitting the communication to the plurality of relay UEs for cooperative relaying to the destination UE.

In some aspects, an apparatus for wireless communication includes means for receiving, from a source UE, a first report indicating at least one of a signal strength measurement or a channel estimate; means for receiving, from a relay UE, a second report indicating at least one of a signal strength measurement or a channel estimate; and means for transmitting, to the source UE and based at least in part on the first report and the second report, information identifying that the relay UE is one of a plurality of relay UEs selected for cooperative relaying of a communication from the source UE to a destination node, wherein a channel between the source UE and the relay UE is one of a first plurality of channels comprising a channel between the source UE and each relay UE of the plurality of relay UEs, and a channel between the relay UE and the destination node is one of a second plurality of channels comprising a channel between each relay UE of the plurality of relay UEs and the destination node, and the plurality of relay UEs are selected based at least in part on at least one of a degree of correlation of the channel between the source UE and the relay UE with at least one other channel of the first plurality of channels or a degree of correlation of the channel between the relay UE and the destination node with at least one other channel of the second plurality of channels.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
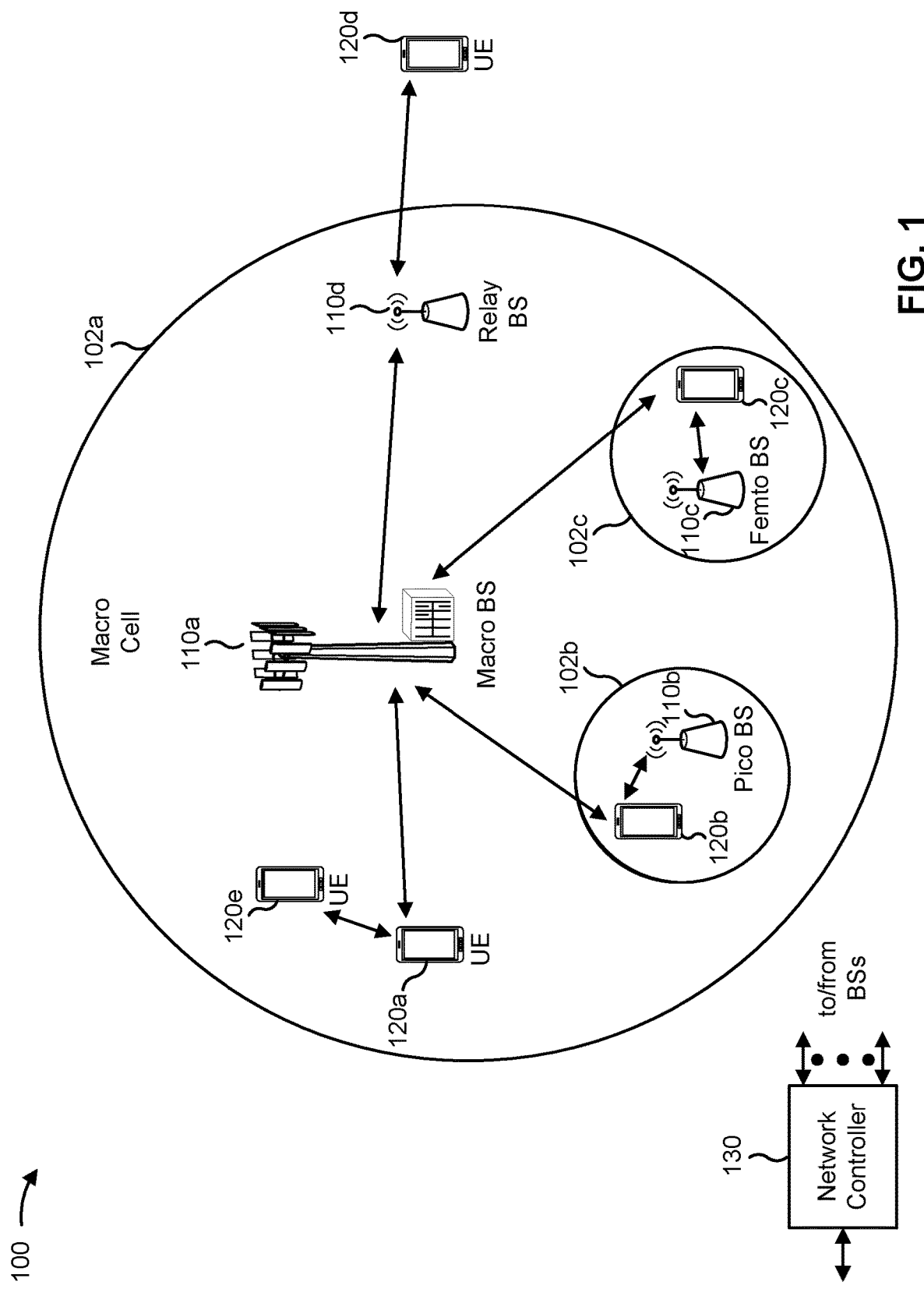
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
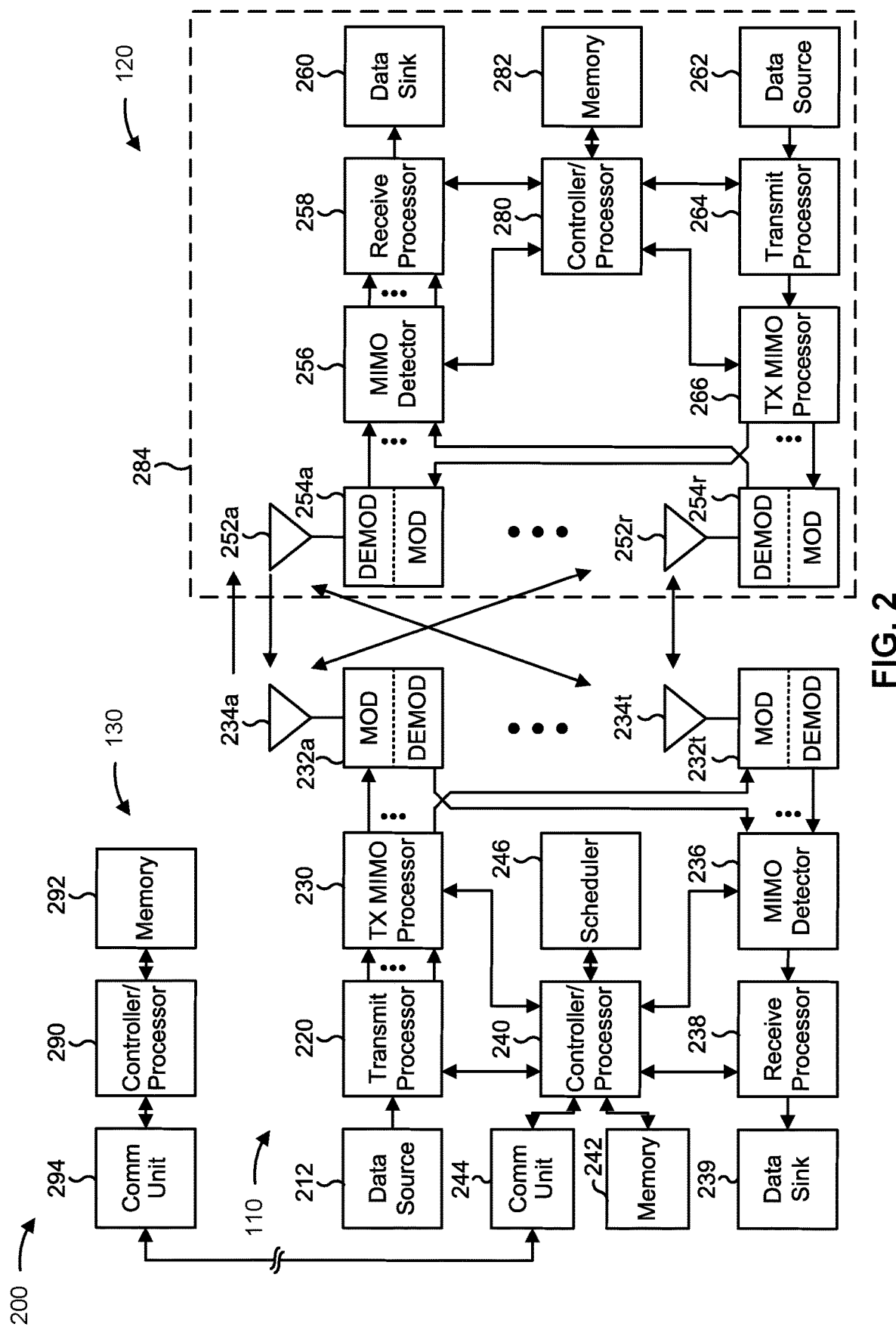
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-9.

Controller/processor 240 of base station 110, controller/processor 280 of UE 120, and/or any other component(s) of FIG. 2 may perform one or more techniques associated with relay selection for cooperative relaying, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE includes means for transmitting (e.g., using controller/processor 280, transmit processor 264, TX MIMO processor 266, MOD 254, antenna 252, memory 282, or the like), to a relay UE, information identifying that the relay UE is one of a plurality of relay UEs selected for cooperative relaying of a communication from the UE to a destination UE, where a channel between the source UE and the relay UE is one of a plurality of channels comprising a channel between the source UE and each relay UE of the plurality of relay UEs, and the plurality of relay UEs are selected based at least in part on a degree of correlation of the channel between the source UE and the relay UE with at least one other channel of the plurality of channels; and/or means for transmitting (e.g., using controller/processor 280, transmit processor 264, TX MIMO processor 266, MOD 254, antenna 252, memory 282, or the like) the communication to the plurality of relay UEs for cooperative relaying to the destination UE. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining (e.g., using controller/processor 280, memory 282, or the like) a set of candidate relay UEs for the cooperative relaying based at least in part on a routing table; and/or means for selecting (e.g., using controller/processor 280, memory 282, or the like) the plurality of relay UEs from the set of candidate relay UEs. In some aspects, the UE includes means for receiving (e.g., using antenna 252, DEMOD 254, MIMO detector 256, receive processor 258, controller/processor 280, memory 282, or the like), from the relay UE, an indication of whether the relay UE is to participate in the cooperative relaying.

In some aspects, the base station includes means for receiving (e.g., using antenna 234, DEMOD 232, MIMO detector 236, receive processor 238, controller/processor 240, memory 242, or the like), from a source UE, a first report indicating at least one of a signal strength measurement or a channel estimate; means for receiving (e.g., using antenna 234, DEMOD 232, MIMO detector 236, receive processor 238, controller/processor 240, memory 242, or the like), from a relay UE, a second report indicating at least one of a signal strength measurement or a channel estimate; and/or means for transmitting (e.g., using controller/processor 240, transmit processor 220, TX MIMO processor 230, MOD 232, antenna 234, memory 242, or the like), to the source UE and based at least in part on the first report and the second report, information identifying that the relay UE is one of a plurality of relay UEs selected for cooperative relaying of a communication from the source UE to a destination node, where a channel between the source UE and the relay UE is one of a first plurality of channels comprising a channel between the source UE and each relay UE of the plurality of relay UEs, and a channel between the relay UE and the destination node is one of a second plurality of channels comprising a channel between each relay UE of the plurality of relay UEs and the destination node, and the plurality of relay UEs are selected based at least in part on at least one of a degree of correlation of the channel between the source UE and the relay UE with at least one other channel of the first plurality of channels or a degree of correlation of the channel between the relay UE and the destination node with at least one other channel of the second plurality of channels. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for determining (e.g., using controller/processor 240, memory 242, or the like) a set of candidate relay UEs for the cooperative relaying based at least in part on a routing table; and/or means for selecting (e.g., using controller/processor 240, memory 242, or the like) the plurality of relay UEs from the set of candidate relay UEs.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
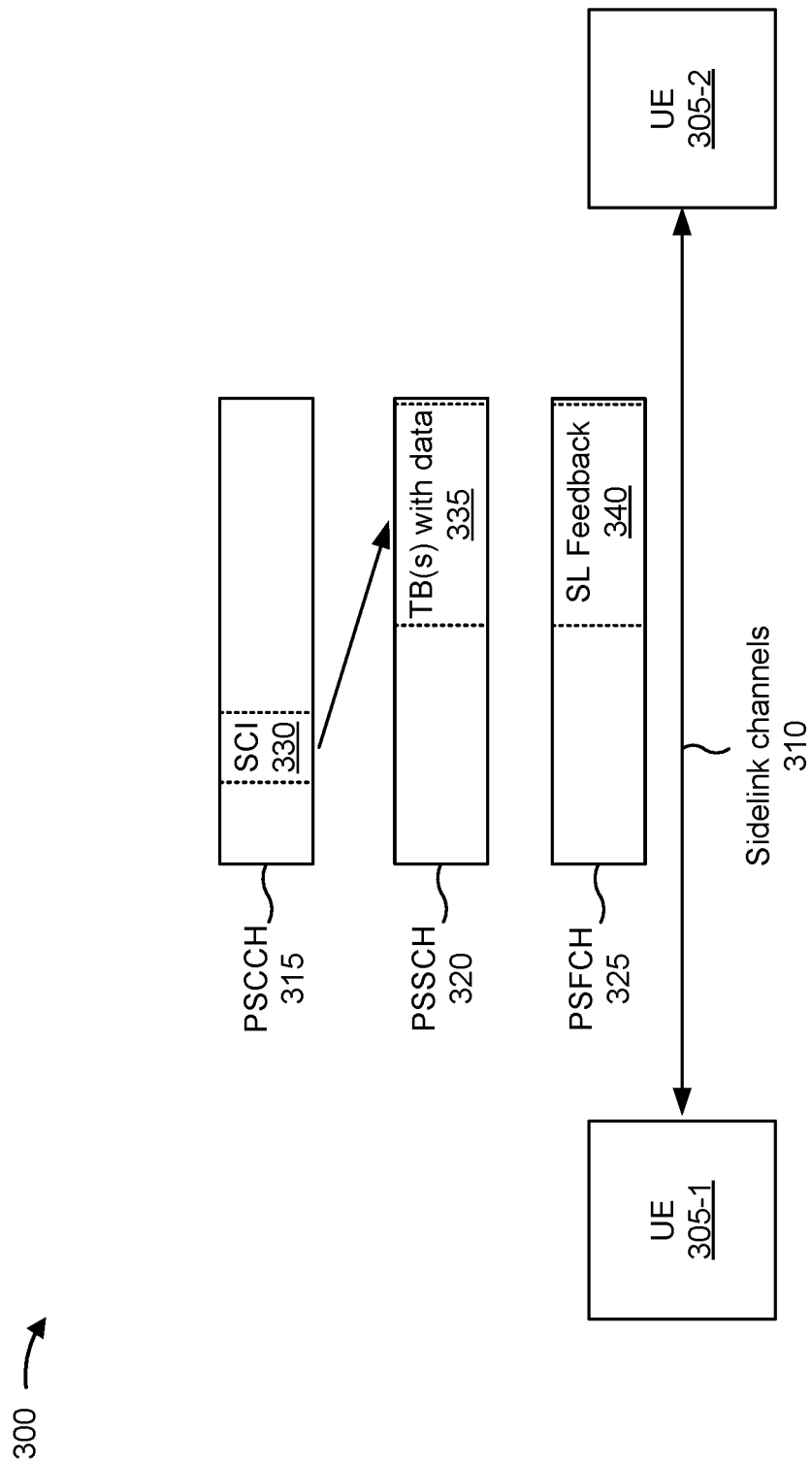
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
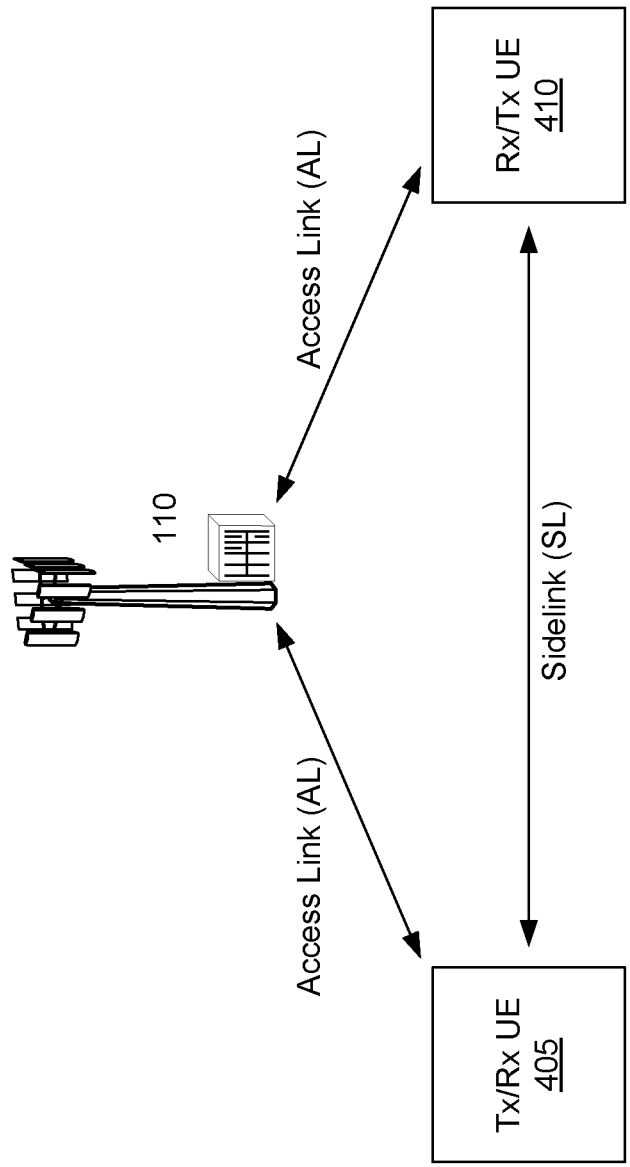
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
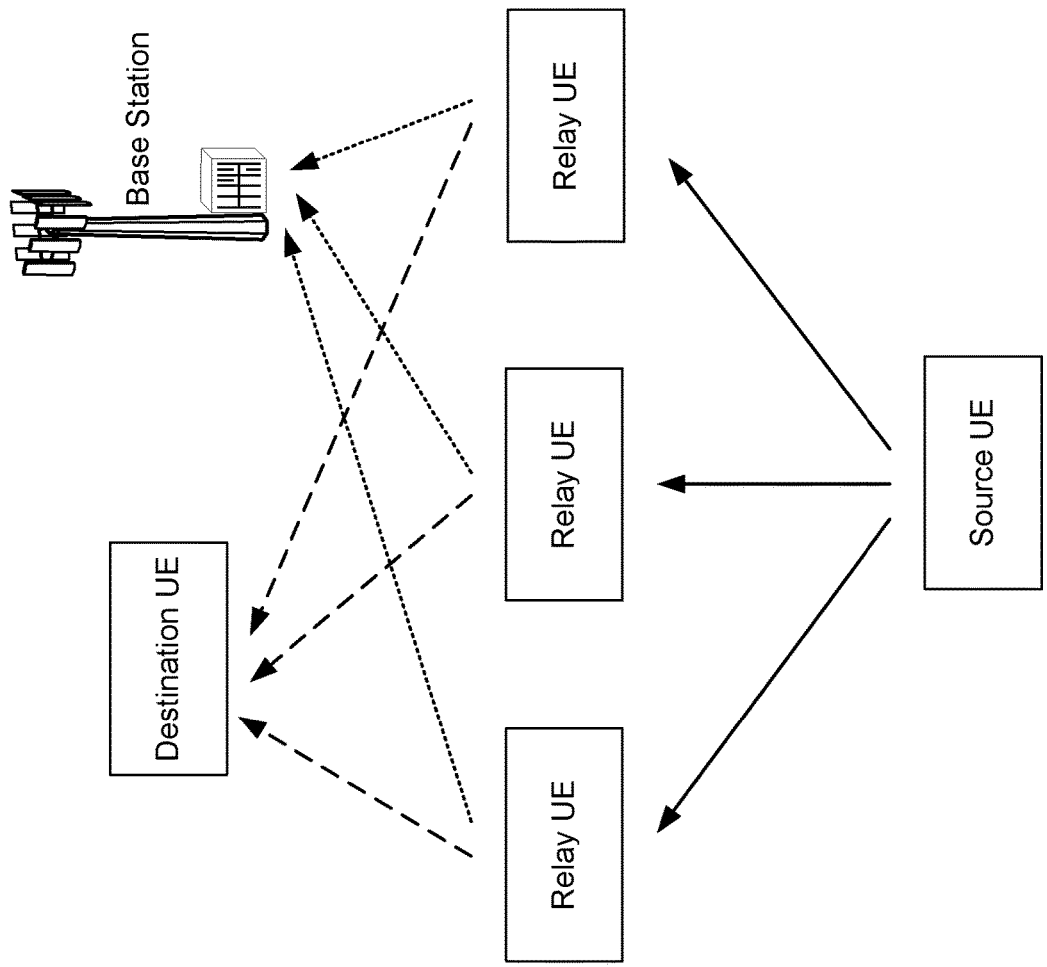
FIG. 5 is a diagram illustrating an example of cooperative relaying, in accordance with the present disclosure.

FIG. 5 is a diagram illustrating an example 500 of cooperative relaying, in accordance with the present disclosure. In some examples, a relay UE may relay a communication from a source UE to a destination UE or a base station. For example, the source UE may transmit the communication to the relay UE on a sidelink, and the relay UE may relay the communication to the destination UE on a sidelink or to the base station on an access link. The description to follow may refer to a UE that is to transmit a communication as a source UE; a UE that is to relay a communication as a relay UE; and a UE that is to receive a communication as a destination UE. However, a UE may not be associated with a single role. For example, a relay UE may perform relaying of a first communication, may be the source of a second communication, and/or may be the destination of a third communication.

As shown in FIG. 5, multiple relay UEs may be employed for cooperative relaying of a communication from a source UE to a destination UE. In cooperative relaying, the multiple relay UEs may perform cooperative MIMO to relay a communication from the source UE to the destination UE. For example, each relay UE may relay a MIMO layer of a multi-layer MIMO transmission.

As shown in FIG. 5, the source UE may transmit a signal to multiple neighboring relay UEs on respective sidelink channels. For example, the source may perform a broadcast (e.g., a groupcast) transmission of the signal to the relay UEs. The multiple relay UEs may perform cooperative MIMO to relay, on respective sidelink channels, the signal to the destination UE. For example, each relay UE may perform a unicast transmission to the destination UE. In some examples, the multiple relay UEs may perform cooperative MIMO to relay, on respective access link channels, the signal to the base station. For example, each relay UE may perform a unicast transmission to the base station. The cooperative MIMO performed by the relay UEs may be synchronous or asynchronous.

In some examples, respective channels between the source UE and the multiple relay UEs may be highly correlated (e.g., the channels may be associated with the same characteristics). Additionally, or alternatively, respective channels between the multiple relay UEs and the destination UE (or the base station) may be highly correlated. Performance gains associated with cooperative MIMO may not be achieved when the channels are highly correlated.

Techniques and apparatuses described herein provide for selection of a relay UE for cooperative relaying (e.g., cooperative MIMO). In some aspects, a relay UE may be selected for the cooperative relaying based at least in part on a channel between a source UE and the relay UE being associated with a signal strength that satisfies a threshold value. Additionally, or alternatively, the relay UE may be selected for the cooperative relaying based at least in part on a channel between a destination node (e.g., a destination UE or a base station) and the relay UE being associated with a signal strength that satisfies a threshold value.

In some aspects, a relay UE may be selected for the cooperative relaying based at least in part on a channel between a source UE and the relay UE having a low correlation with a channel between the source UE and a different relay UE that is selected for the cooperative relaying. Additionally, or alternatively, the relay UE may be selected based at least in part on a channel between the destination node and the relay UE having a low correlation with a channel between the destination node and the different relay UE that is selected for the cooperative relaying. In some aspects, UEs may report channel estimates (e.g., channel matrices) with each other and/or with the base station to facilitate determination of channel correlations.

While reporting of the channel estimates may increase signaling overhead, low channel correlation among a set of relay UEs selected for cooperative relaying may be achieved. Accordingly, the cooperative relaying may be associated with diversity gains and power gains that improve the reliability and coverage of relayed communications. Moreover, if the destination node is a base station, the techniques and apparatuses described herein may improve uplink coverage (e.g., with some additional latency due to multiple hop transmissions).

As indicated above, FIG. 5 is provided as an example. Other examples may differ from what is described with respect to FIG. 5.

Figure 6:
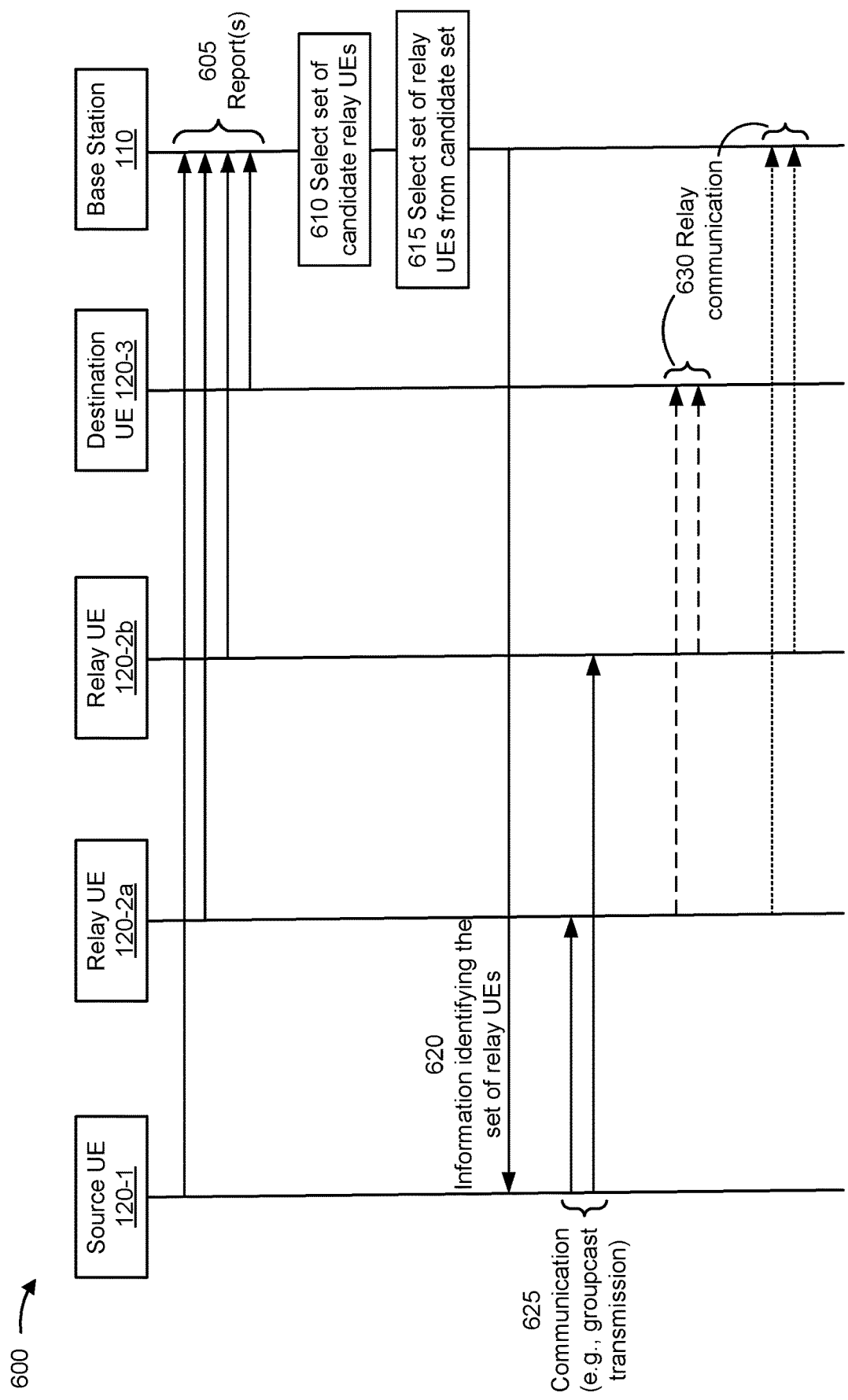
FIGS. 6-7 are diagrams illustrating examples associated with relay selection for cooperative relaying, in accordance with the present disclosure.

FIG. 6 is a diagram illustrating an example 600 associated with relay selection for cooperative relaying, in accordance with the present disclosure. As shown in FIG. 6, example 600 includes communication between a base station 110 and multiple UEs 120. For example, example 600 includes a source UE 120-1, two relay UEs 120-2a and 120-2b, and a destination UE 120-3. Although example 600 includes two relay UEs, in some examples, three relay UEs, four relay UEs, or another quantity of relay UEs may be used.

In some aspects, the base station 110 and the UEs 120 may be included in a wireless network, such as the wireless network 100. The base station 110 and the UEs 120 may communicate via wireless access links, which may include an uplink and a downlink. For example, the base station 110 and the UEs 120 may communicate via respective access link channels. The UEs 120 may communicate with each other via wireless sidelinks. For example, the UEs 120 may communicate with each other via respective sidelink channels.

In some aspects, the UEs 120 may be stationary UEs (e.g., the UEs 120 are included in a stationary sidelink network). Additionally, or alternatively, the UEs 120 may be low mobility UEs (e.g., the UEs 120 are included in a low mobility sidelink network). For example, the UEs 120 may be associated with a speed of movement that is below a threshold value.

As shown by reference number 605, a UE 120 may transmit, and the base station 110 may receive, a report relating to a neighboring UE 120 (e.g., another UE in the sidelink network with the UE 120). The UE 120 may transmit the report periodically. In some aspects, each UE 120 in the sidelink network may transmit respective reports (e.g., periodically) relating to the other UEs 120 in the sidelink network. For example, the base station 110 may receive a first report from the source UE 120-1, the base station 110 may receive a second report from a relay UE 120-2, the base station 110 may receive a third report from the destination UE 120-3, and so forth.

In some aspects, a report may indicate at least one of a signal strength measurement or a channel estimate. For example, a UE 120 may perform measurements and/or channel estimation in connection with a channel between the UE 120 and a neighboring UE 120, in order to generate the report. In some aspects, a report from the source UE 120-1 may indicate an RSRP measurement for a channel between the source UE 120-1 and a relay UE 120-2 and/or may indicate a channel estimate (e.g., a channel matrix) for the channel. In some aspects, a report from a relay UE 120-2 may indicate an RSRP measurement for a channel between the relay UE 120-2 and the destination UE 120-3 and/or may indicate a channel estimate (e.g., a channel matrix) for the channel.

In some aspects, a report may indicate both of an RSRP measurement and a channel estimate when the destination for a relayed communication is the destination UE 120. In some aspects, a report may indicate only an RSRP measurement when the destination for a relayed communication is the base station 110.

As shown by reference number 610, the base station 110 may select a set of candidate relay UEs for cooperative relaying of one or more communications between the source UE 120-1 and a destination node. The destination node may be the destination UE 120-3 or the base station 110. In some aspects, the base station 110 may select the set of candidate relay UEs based at least in part on a routing table. For example, the base station 110 may determine the routing table based at least in part on a topology of the UEs in the network.

As shown by reference number 615, the base station 110 may select a set of relay UEs (e.g., a plurality of relay UEs) from the set of candidate relay UEs. For example, the set of relay UEs may be a subset of the set of candidate relay UEs. The set of relay UEs may be for actual cooperative relaying of one or more communications between the source UE 120-1 and the destination node. For example, the set of relay UEs may include relay UE 120-2a and relay UE 120-2b. In some aspects, a first plurality of channels (e.g., of a first hop) may include a channel between the source UE 120-1 and each relay UE 120-2 of the set of relay UEs (or the set of candidate relay UEs). Thus, a channel between the source UE 120-1 and a relay UE 120-2 may be one of the first plurality of channels. In some aspects, a second plurality of channels (e.g., of a second hop) may include a channel between each relay UE 120-2 of the set of relay UEs (or the set of candidate relay UEs) and the destination node. Thus, a channel between a relay UE 120-2 and the destination node may be one of the second plurality of channels.

In some aspects, the base station 110 may select the set of relay UEs based at least in part on the reports received from the UEs 120 (e.g., the first report received from the source UE 120-1 and the second report received from the relay UE 120-2). In some aspects, the base station 110 may select the set of relay UEs based at least in part on respective signal strength measurements for the first plurality of channels (e.g., respective channels between the source UE 120 and the set of relay UEs), and/or respective signal strength measurements for the second plurality of channels (e.g., respective channels between the set of relay UEs and the destination node). The respective signal strength measurements may be according to reports received by the base station 110.

Additionally, or alternatively, the base station 110 may select the set of relay UEs based at least in part on a degree of correlation (e.g., high correlation, low correlation, or the like) of a channel of the first plurality of channels (e.g., a channel between the source UE 120-1 and a relay UE 120-2) with at least one other channel of the first plurality of channels (e.g., of the first hop), and/or a degree of correlation of a channel of the second plurality of channels (e.g., a channel between the relay UE 120-2 and the destination node) with at least one other channel of the second plurality of channels (e.g., of the second hop). In some aspects, the base station 110 may select a relay UE 120-2 for the set of relay UEs based at least in part on respective degrees of correlation of a channel between the source UE 120-1 and the relay UE 120-2 with every other channel of the first plurality of channels and/or respective degrees of correlation of a channel between the relay UE 120-2 and the destination node with every other channel of the second plurality of channels. For example, the base station 110 may select the set of relay UEs such that there is a low correlation (e.g., a correlation value below a threshold value) between any two channels of the first plurality of channels and/or between any two channels of the second plurality of channels.

In some aspects, the base station 110 may determine a degree of correlation of two channels (e.g., of the first plurality of channels or of the second plurality of channels). For example, the base station 110 may determine a correlation factor (or a correlation coefficient) that indicates a degree of correlation of the two channels. The base station 110 may determine the correlation factor based at least in part on channel estimates (e.g., channel matrices) associated with the two channels (e.g., according to reports received by the base station 110).

In some aspects, the base station 110 may select a relay UE 120-2, for the set of relay UEs that are to be used for the cooperative relaying, based at least in part on a determination that the relay UE 120-2 satisfies one or more conditions. The conditions used when the destination node is the destination UE 120-3 may be different from the conditions used when the destination node is the base station 110, as described below.

In some aspects, for example when the destination node is the destination UE 120-3, the base station 110 may select a relay UE 120-2 (e.g., relay UE 120-2b) for the set of relay UEs based at least in part on a determination that: an RSRP measurement (e.g., a filtered RSRP measurement, which may be a raw RSRP measurement that is filtered, such as by higher-layer filtering) for a channel between the source UE 120-1 and the relay UE 120-2 is above a first threshold value; an RSRP measurement (e.g., a filtered RSRP measurement) for a channel between the relay UE 120-2 and the destination UE 120-3 is above a second threshold value; a correlation factor for the channel between the source UE 120-1 and the relay UE 120-2 and a channel between the source UE 120-1 and a different relay UE 120-2 (e.g., relay UE 120-2a), that is already selected for the set of relay UEs, is below a first correlation threshold value (e.g., this condition may be assessed separately for each different relay UE that is already selected); and/or a correlation factor for the channel between the relay UE 120-2 and the destination UE 120-3 and a channel between the different relay UE 120-2 and the destination UE 120-3 is below a second correlation threshold value (e.g., this condition may be assessed separately for each different relay UE that is already selected).

In some aspects, the base station 110 may select the relay UE 120-2 for the set of relays if all four conditions described above are satisfied. In some aspects, the first threshold value or the first correlation threshold value may be a threshold value associated with a first hop from a source to a relay. In some aspects, the second threshold value or the second correlation threshold value may be a threshold value associated with a second hop from a relay to a destination. In some aspects, the first threshold value and the second threshold value may be the same value or different values. In some aspects, the first correlation threshold value and the second correlation threshold value may be the same value or different values.

In some aspects, for example when the destination node is the base station 110, the base station 110 may select a relay UE 120-2 (e.g., relay UE 120-2b) for the set of relay UEs based at least in part on a determination that: an RSRP measurement (e.g., a filtered RSRP measurement) for a channel between the source UE 120-1 and the relay UE 120-2 is above a first threshold value; a sounding reference signal (SRS) power measurement for a channel between the relay UE 120-2 and the base station 110 (e.g., the base station 110 may receive and measure an SRS transmitted by the relay UE 120-2) is above a second threshold value; a correlation factor for the channel between the source UE 120-1 and the relay UE 120-2 and a channel between the source UE 120-1 and a different relay UE 120-2 (e.g., relay UE 120-2a), that is already selected for the set of relay UEs, is below a first correlation threshold value (e.g., this condition may be assessed separately for each different relay UE that is already selected); and/or a correlation factor for the channel between the relay UE 120-2 and the base station 110 and a channel between the different relay UE 120-2 and the base station 110 is below a second correlation threshold value (e.g., this condition may be assessed separately for each different relay UE that is already selected).

In some aspects, the base station 110 may select the relay UE 120-2 for the set of relays if all four conditions described above are satisfied. The first threshold value, the second threshold value, the first correlation threshold value, and the second correlation threshold value may have values as described above.

In this way, the base station 110 may select the set of relay UEs in a manner that minimizes channel correlations. Accordingly, channel diversity for the cooperative relaying is improved. In some cases, only a single relay UE 120-2 may satisfy the conditions described above for relay selection. Here, cooperative relaying may not be used, and relaying from the source UE 120-1 to the destination node may be adjusted (e.g., automatically) to a single relay scheme.

As shown by reference number 620, the base station 110 may transmit, and the source UE 120-1 may receive, information identifying the set of relay UEs selected for cooperative relaying from the source UE 120-1 to the destination node (e.g., which may be identified in the information by a source identifier and a destination identifier). In other words, the base station 110 may transmit relay assignment information for the source UE 120-1. The base station 110 may transmit the relay assignment information periodically. In some aspects, the base station 110 may perform a broadcast transmission of relay assignment information for all source UEs (e.g., which may include all UEs 120 in the sidelink network or a subset thereof).

As shown by reference number 625, the source UE 120-1 may transmit a communication for cooperative relaying to the destination node. For example, the source UE 120-1 may perform a groupcast transmission to the set of relay UEs (e.g., relay UE 120-2a and relay UE 120-2b) selected for the source UE 120-1. As shown by reference number 630, the set of relay UEs may perform cooperative relaying of the communication to the destination node (e.g., the destination UE 120-3 or the base station 110). For example, each relay UE 120-2, of the set of relay UEs, may relay a MIMO layer of the communication to the destination node.

As indicated above, FIG. 6 is provided as an example. Other examples may differ from what is described with respect to FIG. 6.

Figure 7:
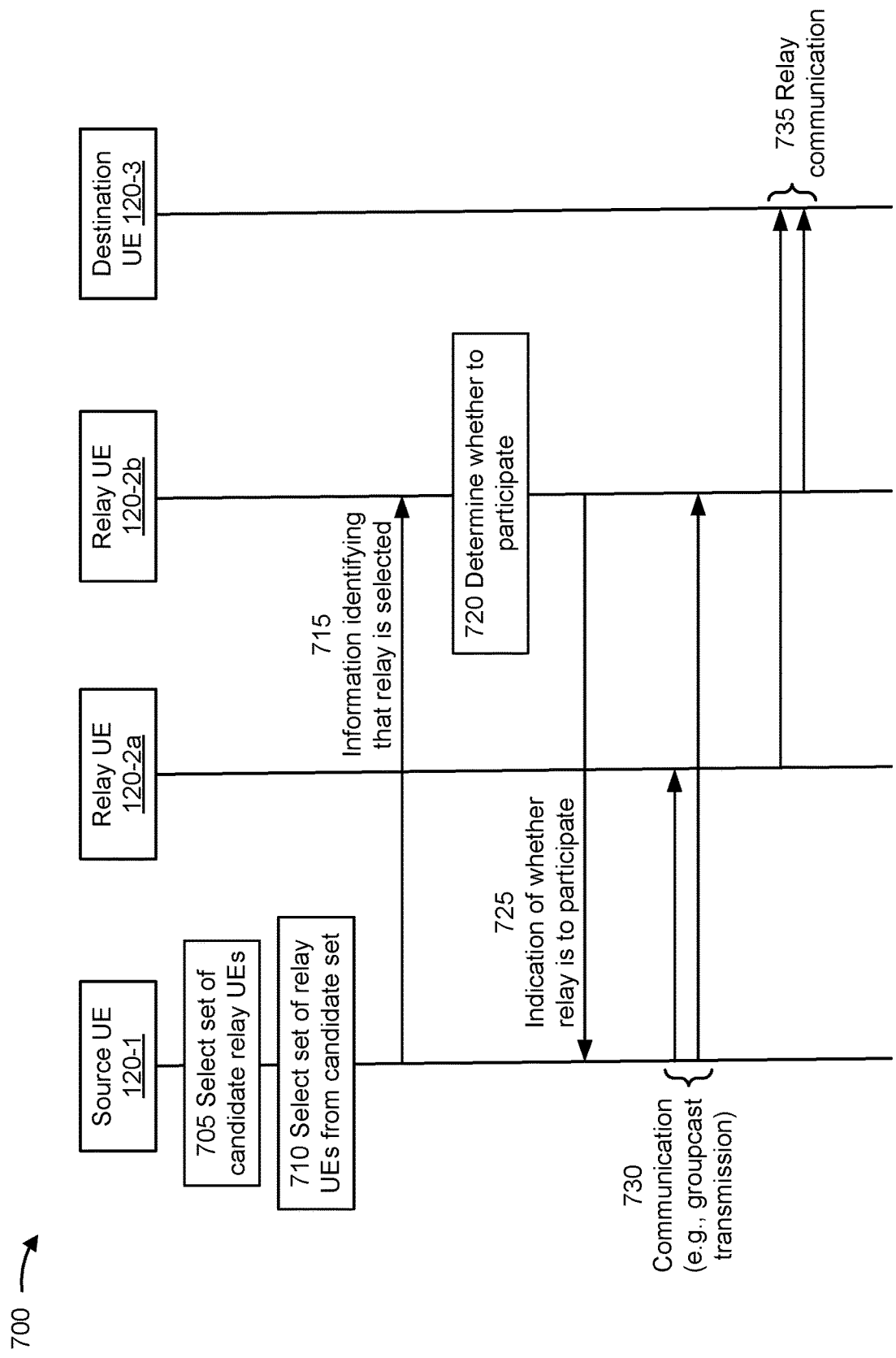

FIG. 7 is a diagram illustrating an example 700 associated with relay selection for cooperative relaying, in accordance with the present disclosure. As shown in FIG. 7, example 700 includes communication between multiple UEs 120. For example, example 700 includes a source UE 120-1, two relay UEs 120-2a and 120-2b, and a destination UE 120-3. Although example 700 includes two relay UEs, in some examples, three relay UEs, four relay UEs, or another quantity of relay UEs may be used.

In some aspects, the UEs 120 may be included in a wireless network, such as the wireless network 100. In some aspects, the UEs 120 may be included in a wireless ad hoc network. In some aspects, one or more of the UEs 120 may not have a radio link with a base station. The UEs 120 may communicate with each other via wireless sidelinks. For example, the UEs 120 may communicate with each other via respective sidelink channels. In some aspects, the UEs 120 may be stationary UEs and/or low mobility UEs, as described above.

As shown by reference number 705, a source UE 120-1 may select a set of candidate relay UEs for cooperative relaying of one or more communications between the source UE 120-1 and the destination UE 120-3. In some aspects, the source UE 120-1 may select the set of candidate relay UEs based at least in part on a routing table (e.g., stored at the source UE 120-1). For example, the source UE 120-1 may determine the routing table based at least in part on a discovery procedure.

According to the discovery procedure, the source UE 120-1 may exchange one or more discovery communications with a neighboring UE 120 in order to identify the neighboring UE 120. In some aspects, the source UE 120-1 may perform one or more measurements and/or channel estimation in connection with a channel (e.g., a discovery channel) between the source UE 120-1 and the neighboring UE 120. For example, the source UE 120-1 may obtain one or more measurements relating to a signal strength for the channel and/or obtain a channel estimate (e.g., a channel matrix) for the channel. Each UE 120 (e.g., one or more relay UEs 120-2 and the destination UE 120-3) in the sidelink network may perform a discovery procedure, as described above.

As shown by reference number 710, the source UE 120-1 may select a set of relay UEs (e.g., a plurality of relay UEs) from the set of candidate relay UEs, in a similar manner as described above. In some aspects, a first plurality of channels (e.g., of a first hop) may include a channel between the source UE 120-1 and each relay UE 120-2 of the set of relay UEs (or the set of candidate relay UEs). Thus, a channel between the source UE 120-1 and a relay UE 120-2 may be one of the first plurality of channels.

In some aspects, the source UE 120-1 may select the set of relay UEs based at least in part on a discovery measurement and/or a channel estimate obtained by the source UE 120-1. In some aspects, the source UE 120-1 may select the set of relay UEs based at least in part on respective discovery measurements for the first plurality of channels (e.g., respective channels between the source UE 120-1 and the set of relay UEs).

Additionally, or alternatively, the source UE 120-1 may select the set of relay UEs based at least in part on a degree of correlation of a channel (e.g., a discovery channel) of the first plurality of channels (e.g., a channel between the source UE 120-1 and a relay UE 120-2) with at least one other channel of the first plurality of channels (e.g., of the first hop). In some aspects, the source UE 120-1 may select a relay UE 120-2 for the set of relay UEs based at least in part on respective degrees of correlation of a channel between the source UE 120-1 and the relay UE 120-2 with every other channel of the first plurality of channels. For example, the source UE 120-1 may select the set of relay UEs such that there is a low correlation (e.g., a correlation value below a threshold value) between any two channels of the first plurality of channels. The source UE 120-1 may determine a degree of correlation (e.g., a correlation factor) of two channels (e.g., of the first plurality of channels) in a similar manner as described above.

In some aspects, the source UE 120-1 may select a relay UE 120-2 for the set of relay UEs, that are to be used for the cooperative relaying, based at least in part on a determination that the relay UE 120-2 satisfies one or more conditions. In some aspects, the source UE 120-1 may select a relay UE 120-2 (e.g., relay UE 120-2*b*) for the set of relay UEs based at least in part on a determination that: a discovery measurement for a channel between the source UE 120-1 and the relay UE 120-2 is above a first threshold value; and/or a correlation factor for the channel between the source UE 120-1 and the relay UE 120-2 and a channel between the source UE 120-1 and a different relay UE 120-2 (e.g., relay UE 120-2*a*), that is already selected for the set of relay UEs, is below a first correlation threshold value (e.g., this condition may be assessed separately for each different relay UE that is already selected). In some aspects, the source UE 120-1 may select the relay UE 120-2 for the set of relays if both conditions described above are satisfied.

As shown by reference number 715, the source UE 120 may transmit, and the relay UE 120-2 (e.g., relay UE 120-2*b*) may receive, information identifying that the relay UE 120-2 is selected for cooperative relaying from the source UE 120-1 to the destination UE 120-3 (e.g., which may be identified in the information by a source identifier and a destination identifier). For example, the information may be included in an SCI message. The source UE 120-1 may transmit such information to each relay UE 120-2 (e.g., relay UE 120-2*a* and relay UE 120-2*b*) selected for inclusion in the set of relay UEs.

As shown by reference number 720, the relay UE 120-2 may determine whether the relay UE 120-2 is to participate in the cooperative relaying. In some aspects, a second plurality of channels (e.g., of a second hop) may include a channel between each relay UE 120-2 of the set of relay UEs (or the set of candidate relay UEs) and the destination UE 120-3. Thus, a channel between the relay UE 120-2 and the destination UE 120-3 may be one of the second plurality of channels.

In some aspects, the relay UE 120-2 may determine whether the relay UE 120-2 is to participate based at least in part on a discovery measurement for a channel between the relay UE 120-2 and the destination UE 120-3. Additionally, or alternatively, the relay UE 120-2 may determine whether the relay UE 120-2 is to participate based at least in part on a degree of correlation of a channel (e.g., a discovery channel) between the relay UE 120-2 and the destination UE 120-3 with at least one other channel of the second plurality of channels (e.g., of the second hop). In some aspects, the relay UE 120-2 may determine whether the relay UE 120-2 is to participate based at least in part on respective degrees of correlation of the channel between the relay UE 120-2 and the destination UE 120-3 with every other channel of the second plurality of channels. For example, the relay UE 120-2 may determine to participate when there is a low correlation (e.g., a correlation value below a threshold value) between the channel between the relay UE 120-2 and the destination UE 120-3 and any other channel of the second plurality of channels. The relay UE 120-2 may determine a degree of correlation (e.g., a correlation factor) of two channels (e.g., of the second hop) in a similar manner as described above. In some aspects, a different relay UE 120-2 (e.g., relay UE 120-2*a*, which has already confirmed participation in the cooperative relaying) may transmit, and the relay UE 120-2 may receive, a report of a channel estimate (e.g., a channel matrix) for a channel (e.g., a discovery channel) between the different relay UE 120-2 and the destination UE 120-3.

In some aspects, the relay UE 120-2 (e.g., relay UE 120-2*a*) may determine to participate in the cooperative relaying based at least in part on a determination that the relay UE 120-2 satisfies one or more conditions. In some aspects, the relay UE 120-2 may determine to participate in the cooperative relaying based at least in part on a determination that: a discovery measurement for a channel between the relay UE 120-2 and the destination UE 120-3 is above a second threshold value; and/or a correlation factor for the channel between the relay UE 120-2 and the destination UE 120-3 and a channel between a different relay UE 120-2 (e.g., relay UE 120-2*a*), that is to participate in the cooperative relaying, and the destination UE 120-3 is below a second correlation threshold value (e.g., this condition may be assessed separately for each different relay UE that is already participating). In some aspects, the relay UE 120-2 may determine to participate in the cooperative relaying if both conditions described above are satisfied. Otherwise, the relay UE 120-2 may determine not to participate in the cooperative relaying.

In some aspects, each relay UE 120-2 (e.g., relay UE 120-2*a* and relay UE 120-2*b*) selected for the set of relay UEs may determine whether to participate in the cooperative relaying in a similar manner as described above. Moreover, the first threshold value, the second threshold value, the first correlation threshold value, and the second correlation threshold value may have values as described above.

As shown by reference number 725, the relay UE 120-2 (e.g., relay UE 120-2*b*) may transmit, and the source UE 120-1 may receive, an indication (e.g., a signal) of whether the relay UE 120-2 is to participate in the cooperative relaying from the source UE 120-1 to the destination UE 120-3 (e.g., which may be identified in the information by a source identifier and a destination identifier). For example, the relay UE 120-2 may transmit an indication that the relay UE 120-2 is to participate in the cooperative relaying (e.g., based at least in part on the relay UE 120-2 determining to participate, as described above). As another example, the relay UE 120-2 may transmit an indication that the relay UE 120-2 is not to participate in the cooperative relaying (e.g., based at least in part on the relay UE 120-2 determining not to participate).

The source UE 120-1 may determine a final set of relay UEs for the cooperative relaying based at least in part on indications received from one or more relay UEs 120-2 (e.g., relay UE 120-2*a* and relay UE 120-2*b*). For example, the source UE 120-1 may determine to include a relay UE 120-2 in the final set of relay UEs based at least in part on receiving an indication that the relay UE 120-2 is to participate in the cooperative relaying (e.g., a confirmation signal).

As shown by reference number 730, the source UE 120-1 may transmit a communication for cooperative relaying to the destination UE 120-3, in a similar manner as described above. For example, the source UE 120-1 may perform a groupcast transmission to the final set of relay UEs (e.g., relay UE 120-2*a* and relay UE 120-2*b*). As shown by reference number 735, the final set of relay UEs may perform cooperative relaying of the communication to the destination UE 120-3, in a similar manner as described above.

As indicated above, FIG. 7 is provided as an example. Other examples may differ from what is described with respect to FIG. 7.

Figure 8:
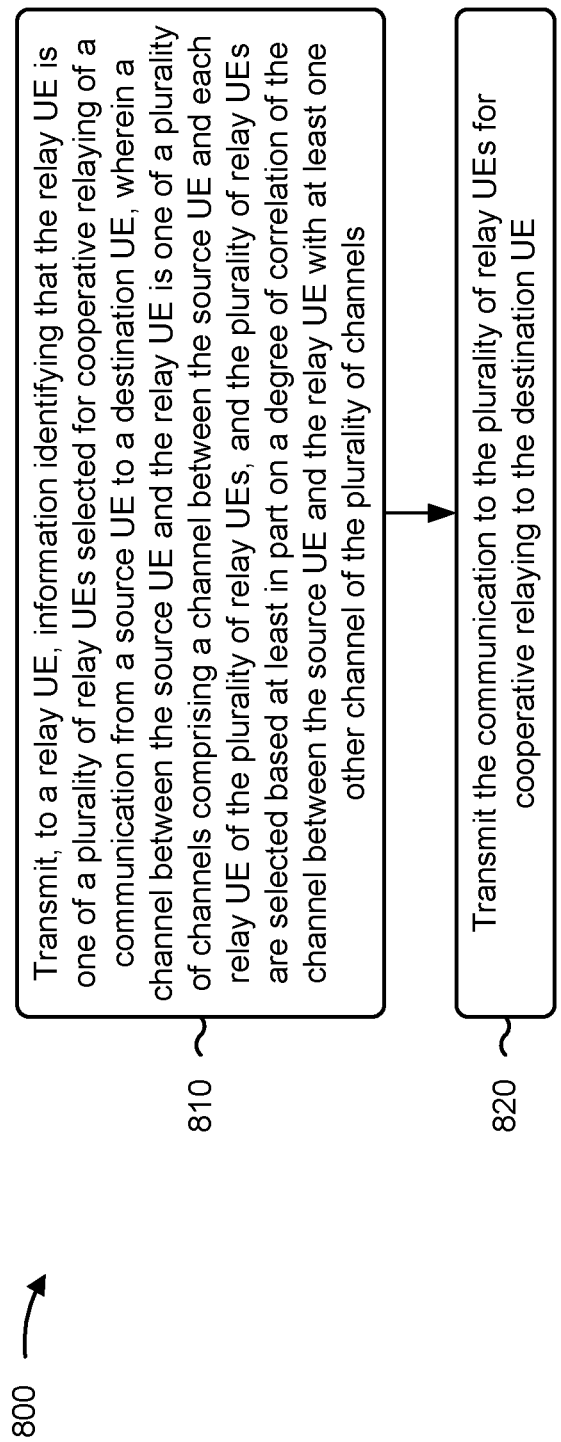
FIGS. 8-9 are diagrams illustrating example processes associated with relay selection for cooperative relaying, in accordance with the present disclosure.

FIG. 8 is a diagram illustrating an example process 800 performed, for example, by a source UE, in accordance with the present disclosure. Example process 800 is an example where the source UE (e.g., source UE 120-1) performs operations associated with relay selection for cooperative relaying.

As shown in FIG. 8, in some aspects, process 800 may include transmitting, to a relay UE, information identifying that the relay UE is one of a plurality of relay UEs selected for cooperative relaying of a communication from a source UE to a destination UE, wherein a channel between the source UE and the relay UE is one of a plurality of channels comprising a channel between the source UE and each relay UE of the plurality of relay UEs, and the plurality of relay UEs are selected based at least in part on a degree of correlation of the channel between the source UE and the relay UE with at least one other channel of the plurality of channels (block 810). For example, the source UE (e.g., using transmission component 1004, depicted in FIG. 10) may transmit, to a relay UE, information identifying that the relay UE is one of a plurality of relay UEs selected for cooperative relaying of a communication from the source UE to a destination UE, as described above, for example, with reference to FIGS. 6 and/or 7. In some aspects, a channel between the source UE and the relay UE is one of a plurality of channels comprising a channel between the source UE and each relay UE of the plurality of relay UEs. In some aspects, the plurality of relay UEs are selected based at least in part on a degree of correlation of the channel between the source UE and the relay UE with at least one other channel of the plurality of channels.

As further shown in FIG. 8, in some aspects, process 800 may include transmitting the communication to the plurality of relay UEs for cooperative relaying to the destination UE (block 820). For example, the source UE (e.g., using transmission component 1004, depicted in FIG. 10) may transmit the communication to the plurality of relay UEs for cooperative relaying to the destination UE, as described above, for example, with reference to FIGS. 6 and/or 7.

Process 800 may include additional aspects, such as any single aspect or any combination of aspects described below and/or in connection with one or more other processes described elsewhere herein.

In a first aspect, process 800 includes determining a set of candidate relay UEs for the cooperative relaying based at least in part on a routing table, and selecting the plurality of relay UEs from the set of candidate relay UEs.

In a second aspect, alone or in combination with the first aspect, the relay UE is selected for the cooperative relaying further based at least in part on a discovery measurement for the channel between the source UE and the relay UE being above a threshold value, and a correlation factor for the channel between the source UE and the relay UE and another channel, of the plurality of channels, corresponding to a channel between the source UE and a different relay UE, of the plurality of relay UEs, being below a threshold value.

In a third aspect, alone or in combination with one or more of the first and second aspects, process 800 includes receiving, from the relay UE, an indication of whether the relay UE is to participate in the cooperative relaying.

In a fourth aspect, alone or in combination with one or more of the first through third aspects, the indication indicates that the relay UE is to participate in the cooperative relaying based at least in part on a discovery measurement for a channel between the relay UE and the destination UE being above a threshold value, and a correlation factor for the channel between the relay UE and the destination UE and a channel between a different relay UE, of the plurality of relay UEs, and the destination UE being below a threshold value.

In a fifth aspect, alone or in combination with one or more of the first through fourth aspects, the communication is transmitted to the relay UE based at least in part on the indication.

In a sixth aspect, alone or in combination with one or more of the first through fifth aspects, the at least one other channel of the plurality of channels comprises every other channel of the plurality of channels.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
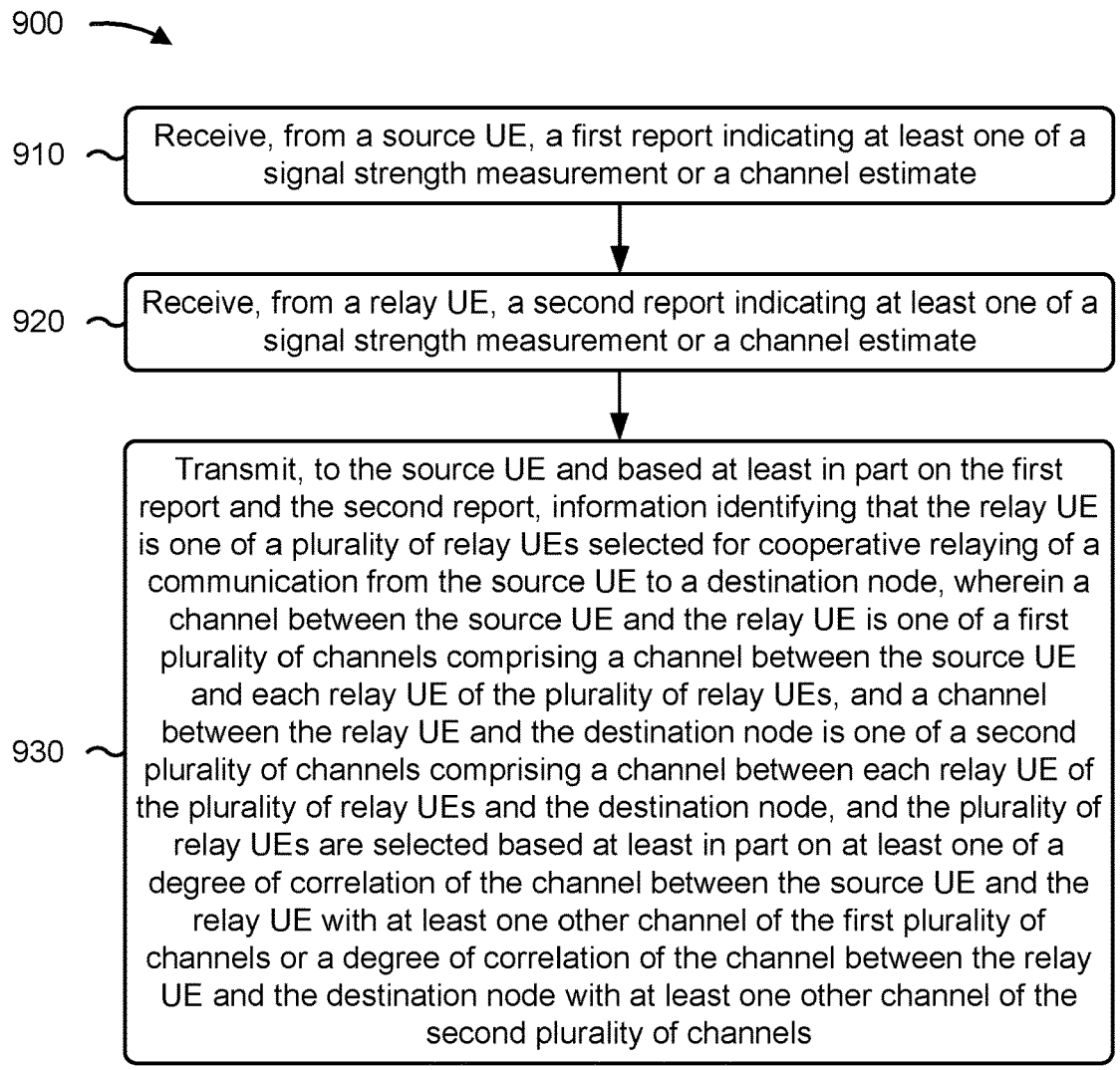

FIG. 9 is a diagram illustrating an example process 900 performed, for example, by a base station, in accordance with the present disclosure. Example process 900 is an example where the base station (e.g., base station 110) performs operations associated with relay selection for cooperative relaying.

As shown in FIG. 9, in some aspects, process 900 may include receiving, from a source UE, a first report indicating at least one of a signal strength measurement or a channel estimate (block 910). For example, the base station (e.g., using reception component 1102, depicted in FIG. 11) may receive, from a source UE, a first report indicating at least one of a signal strength measurement or a channel estimate, as described above, for example, with reference to FIGS. 6 and/or 7.

As further shown in FIG. 9, in some aspects, process 900 may include receiving, from a relay UE, a second report indicating at least one of a signal strength measurement or a channel estimate (block 920). For example, the base station (e.g., using reception component 1102, depicted in FIG. 11) may receive, from a relay UE, a second report indicating at least one of a signal strength measurement or a channel estimate, as described above, for example, with reference to FIGS. 6 and/or 7.

As further shown in FIG. 9, in some aspects, process 900 may include transmitting, to the source UE and based at least in part on the first report and the second report, information identifying that the relay UE is one of a plurality of relay UEs selected for cooperative relaying of a communication from the source UE to a destination node, wherein a channel between the source UE and the relay UE is one of a first plurality of channels comprising a channel between the source UE and each relay UE of the plurality of relay UEs, and a channel between the relay UE and the destination node is one of a second plurality of channels comprising a channel between each relay UE of the plurality of relay UEs and the destination node, and the plurality of relay UEs are selected based at least in part on at least one of a degree of correlation of the channel between the source UE and the relay UE with at least one other channel of the first plurality of channels or a degree of correlation of the channel between the relay UE and the destination node with at least one other channel of the second plurality of channels (block 930). For example, the base station (e.g., using transmission component 1104, depicted in FIG. 11) may transmit, to the source UE and based at least in part on the first report and the second report, information identifying that the relay UE is one of a plurality of relay UEs selected for cooperative relaying of a communication from the source UE to a destination node, as described above, for example, with reference to FIGS. 6 and/or 7. In some aspects, a channel between the source UE and the relay UE is one of a first plurality of channels comprising a channel between the source UE and each relay UE of the plurality of relay UEs, and a channel between the relay UE and the destination node is one of a second plurality of channels comprising a channel between each relay UE of the plurality of relay UEs and the destination node. In some aspects, the plurality of relay UEs are selected based at least in part on at least one of a degree of correlation of the channel between the source UE and the relay UE with at least one other channel of the first plurality of channels or a degree of correlation of the channel between the relay UE and the destination node with at least one other channel of the second plurality of channels.

Process 900 may include additional aspects, such as any single aspect or any combination of aspects described below and/or in connection with one or more other processes described elsewhere herein.

In a first aspect, process 900 includes determining a set of candidate relay UEs for the cooperative relaying based at least in part on a routing table, and selecting the plurality of relay UEs from the set of candidate relay UEs.

In a second aspect, alone or in combination with the first aspect, the plurality of relay UEs are selected further based at least in part on at least one of signal strength measurements for the first plurality of channels or signal strength measurements for the second plurality of channels.

In a third aspect, alone or in combination with one or more of the first and second aspects, the relay UE is selected for the cooperative relaying further based at least in part on an RSRP measurement for the channel between the source UE and the relay UE being above a threshold value, an RSRP measurement for the channel between the relay UE and the destination node being above a threshold value, a correlation factor for the channel between the source UE and the relay UE and another channel, of the first plurality of channels, corresponding to a channel between the source UE and a different relay UE, of the plurality of relay UEs, being below a threshold value, and a correlation factor for the channel between the relay UE and the destination node and another channel, of the second plurality of channels, corresponding to a channel between the different relay UE and the destination node, being below a threshold value.

In a fourth aspect, alone or in combination with one or more of the first through third aspects, the relay UE is selected for the cooperative relaying further based at least in part on an RSRP measurement for the channel between the source UE and the relay UE being above a threshold value, an SRS power measurement for the channel between the relay UE and the destination node being above a threshold value, a correlation factor for the channel between the source UE and the relay UE and another channel, of the first plurality of channels, corresponding to a channel between the source UE and a different relay UE, of the plurality of relay UEs, being below a threshold value, and a correlation factor for the channel between the relay UE and the destination node and another channel, of the second plurality of channels, corresponding to a channel between the different relay UE and the destination node, being below a threshold value.

In a fifth aspect, alone or in combination with one or more of the first through fourth aspects, the signal strength measurement of the first report is an RSRP measurement for the channel between the source UE and the relay UE, and the channel estimate of the first report is for the channel between the source UE and the relay UE.

In a sixth aspect, alone or in combination with one or more of the first through fifth aspects, the signal strength measurement of the second report is an RSRP measurement for the channel between the relay UE and the destination node, and the channel estimate of the second report is for the channel between the relay UE and the destination node.

In a seventh aspect, alone or in combination with one or more of the first through sixth aspects, the at least one other channel of the first plurality of channels comprises every other channel of the first plurality of channels, and the at least one other channel of the second plurality of channels comprises every other channel of the second plurality of channels.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
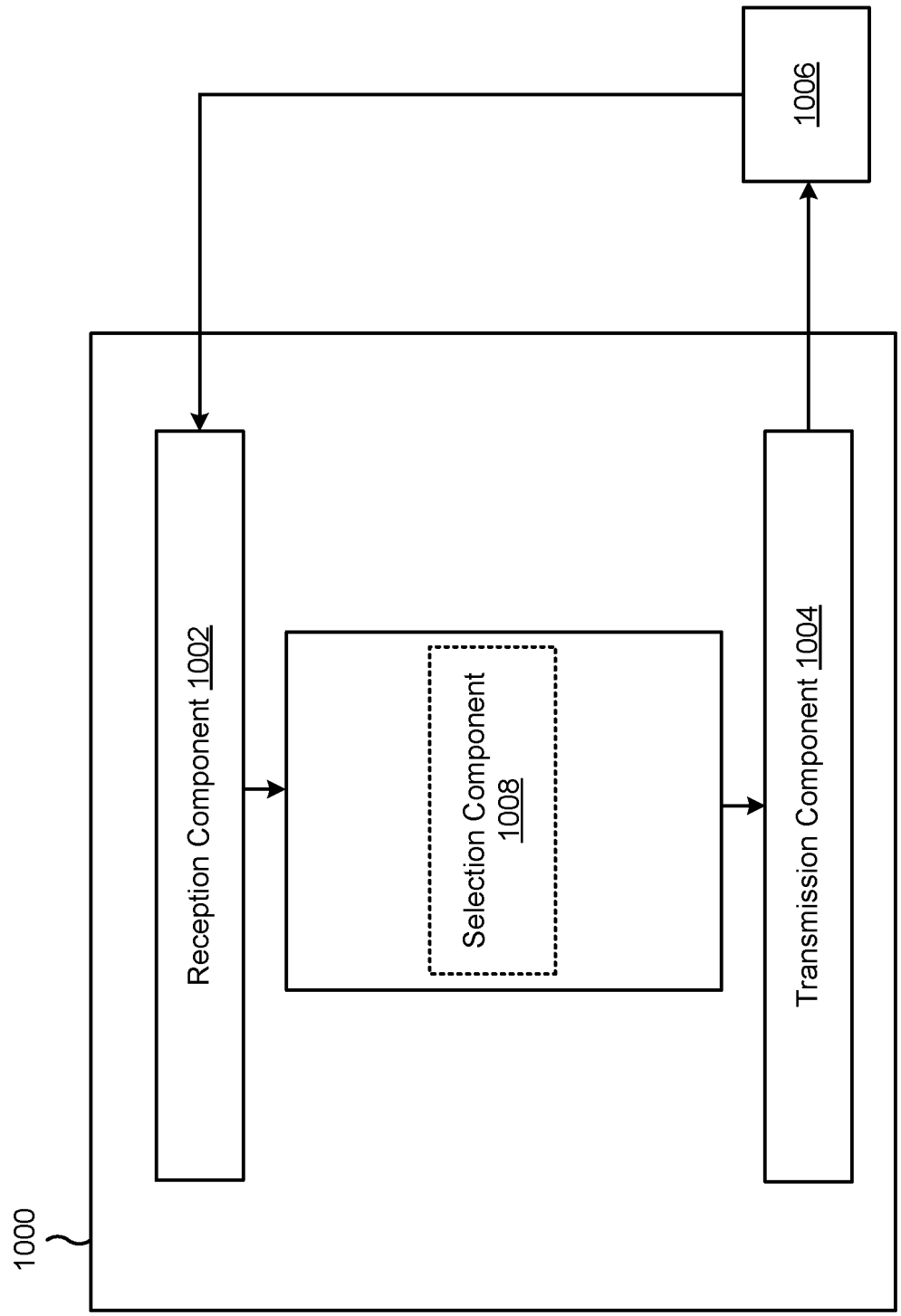
FIGS. 10-11 are diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a selection component 1008, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The transmission component 1004 may transmit, to a relay UE, information identifying that the relay UE is one of a plurality of relay UEs selected for cooperative relaying of a communication from a source UE to a destination UE. In some aspects, a channel between the source UE and the relay UE is one of a plurality of channels comprising a channel between the source UE and each relay UE of the plurality of relay UEs. The selection component 1008 may select the plurality of relay UEs based at least in part on a degree of correlation of the channel between the source UE and the relay UE with at least one other channel of the plurality of channels. The transmission component 1004 may transmit the communication to the plurality of relay UEs for cooperative relaying to the destination UE.

The selection component 1008 may determine a set of candidate relay UEs for the cooperative relaying based at least in part on a routing table. The selection component 1008 may select the plurality of relay UEs from the set of candidate relay UEs. The reception component 1002 may receive, from the relay UE, an indication of whether the relay UE is to participate in the cooperative relaying.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
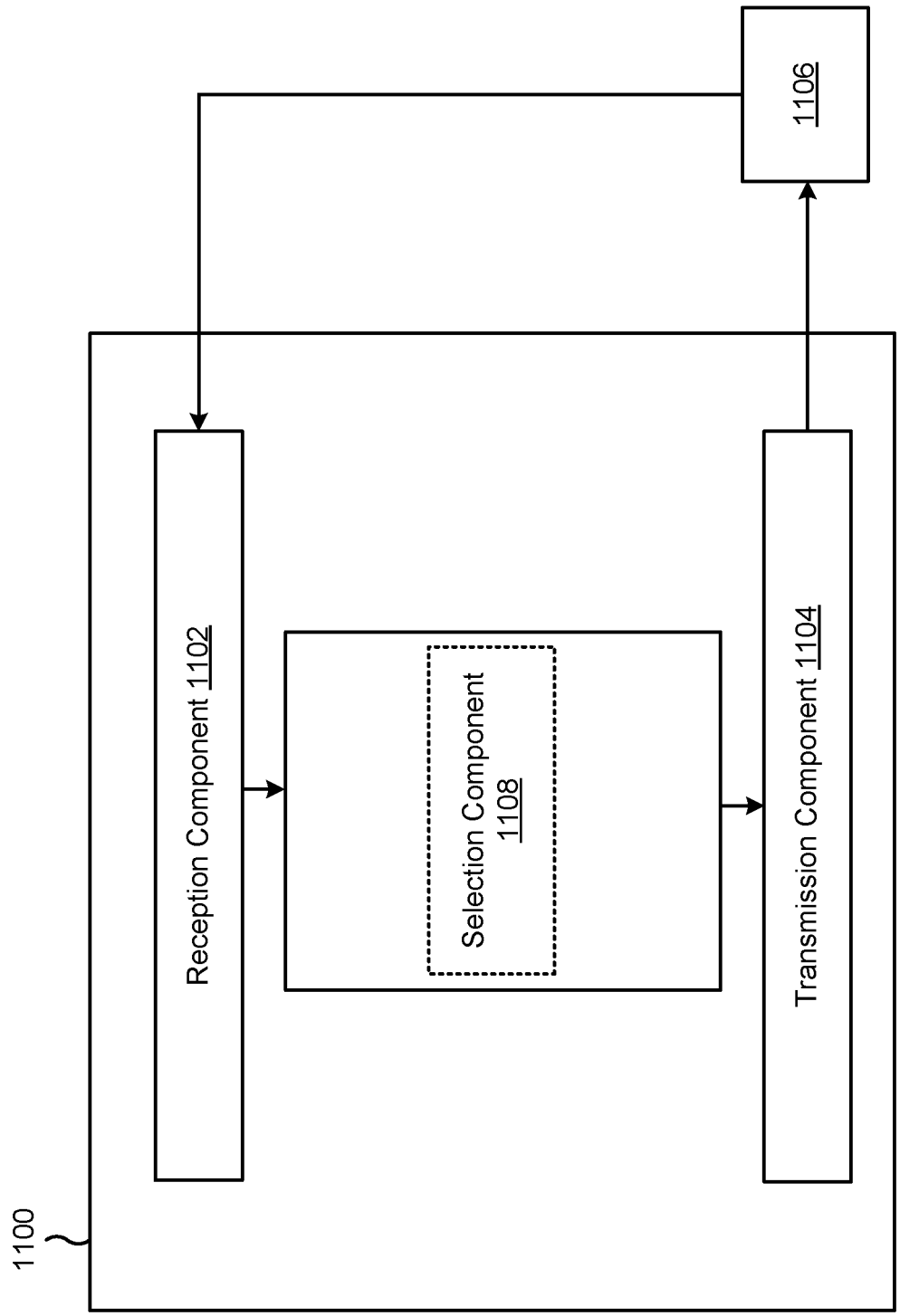

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a selection component 1108, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The reception component 1102 may receive, from a source UE, a first report indicating at least one of a signal strength measurement or a channel estimate. The reception component 1102 may receive, from a relay UE, a second report indicating at least one of a signal strength measurement or a channel estimate. The transmission component 1104 may transmit, to the source UE and based at least in part on the first report and the second report, information identifying that the relay UE is one of a plurality of relay UEs selected for cooperative relaying of a communication from the source UE to a destination node. In some aspects, a channel between the source UE and the relay UE is one of a first plurality of channels comprising a channel between the source UE and each relay UE of the plurality of relay UEs, and a channel between the relay UE and the destination node is one of a second plurality of channels comprising a channel between each relay UE of the plurality of relay UEs and the destination node. The selection component 1108 may select the plurality of relay UEs based at least in part on at least one of a degree of correlation of the channel between the source UE and the relay UE with at least one other channel of the first plurality of channels or a degree of correlation of the channel between the relay UE and the destination node with at least one other channel of the second plurality of channels.

The selection component 1108 may determine a set of candidate relay UEs for the cooperative relaying based at least in part on a routing table. The selection component 1108 may select the plurality of relay UEs from the set of candidate relay UEs.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a source user equipment (UE), comprising: transmitting, to a relay UE, information identifying that the relay UE is one of a plurality of relay UEs selected for cooperative relaying of a communication from the source UE to a destination UE, wherein a channel between the source UE and the relay UE is one of a plurality of channels comprising a channel between the source UE and each relay UE of the plurality of relay UEs, and the plurality of relay UEs are selected based at least in part on a degree of correlation of the channel between the source UE and the relay UE with at least one other channel of the plurality of channels; and transmitting the communication to the plurality of relay UEs for cooperative relaying to the destination UE.

Aspect 2: The method of Aspect 1, further comprising: determining a set of candidate relay UEs for the cooperative relaying based at least in part on a routing table; and selecting the plurality of relay UEs from the set of candidate relay UEs.

Aspect 3: The method of any of Aspects 1-2, wherein the relay UE is selected for the cooperative relaying further based at least in part on: a discovery measurement for the channel between the source UE and the relay UE being above a threshold value; and a correlation factor for the channel between the source UE and the relay UE and another channel, of the plurality of channels, corresponding to a channel between the source UE and a different relay UE, of the plurality of relay UEs, being below a threshold value.

Aspect 4: The method of any of Aspects 1-3, further comprising: receiving, from the relay UE, an indication of whether the relay UE is to participate in the cooperative relaying.

Aspect 5: The method of Aspect 4, wherein the indication indicates that the relay UE is to participate in the cooperative relaying based at least in part on: a discovery measurement for a channel between the relay UE and the destination UE being above a threshold value; and a correlation factor for the channel between the relay UE and the destination UE and a channel between a different relay UE, of the plurality of relay UEs, and the destination UE being below a threshold value.

Aspect 6: The method of Aspect 5, wherein the communication is transmitted to the relay UE based at least in part on the indication.

Aspect 7: The method of any of Aspects 1-6, wherein the at least one other channel of the plurality of channels comprises every other channel of the plurality of channels.

Aspect 8: A method of wireless communication performed by a base station, comprising: receiving, from a source user equipment (UE), a first report indicating at least one of a signal strength measurement or a channel estimate; receiving, from a relay UE, a second report indicating at least one of a signal strength measurement or a channel estimate; and transmitting, to the source UE and based at least in part on the first report and the second report, information identifying that the relay UE is one of a plurality of relay UEs selected for cooperative relaying of a communication from the source UE to a destination node, wherein a channel between the source UE and the relay UE is one of a first plurality of channels comprising a channel between the source UE and each relay UE of the plurality of relay UEs, and a channel between the relay UE and the destination node is one of a second plurality of channels comprising a channel between each relay UE of the plurality of relay UEs and the destination node, and the plurality of relay UEs are selected based at least in part on at least one of a degree of correlation of the channel between the source UE and the relay UE with at least one other channel of the first plurality of channels or a degree of correlation of the channel between the relay UE and the destination node with at least one other channel of the second plurality of channels.

Aspect 9: The method of Aspect 8, further comprising: determining a set of candidate relay UEs for the cooperative relaying based at least in part on a routing table; and selecting the plurality of relay UEs from the set of candidate relay UEs.

Aspect 10: The method of any of Aspects 8-9, wherein the plurality of relay UEs are selected further based at least in part on at least one of signal strength measurements for the first plurality of channels or signal strength measurements for the second plurality of channels.

Aspect 11: The method of any of Aspects 8-10, wherein the relay UE is selected for the cooperative relaying further based at least in part on: a reference signal received power (RSRP) measurement for the channel between the source UE and the relay UE being above a threshold value; an RSRP measurement for the channel between the relay UE and the destination node being above a threshold value; a correlation factor for the channel between the source UE and the relay UE and another channel, of the first plurality of channels, corresponding to a channel between the source UE and a different relay UE, of the plurality of relay UEs, being below a threshold value; and a correlation factor for the channel between the relay UE and the destination node and another channel, of the second plurality of channels, corresponding to a channel between the different relay UE and the destination node being below a threshold value.

Aspect 12: The method of any of Aspects 8-10, wherein the relay UE is selected for the cooperative relaying further based at least in part on: a reference signal received power (RSRP) measurement for the channel between the source UE and the relay UE being above a threshold value; a sounding reference signal (SRS) power measurement for the channel between the relay UE and the destination node being above a threshold value; a correlation factor for the channel between the source UE and the relay UE and another channel, of the first plurality of channels, corresponding to a channel between the source UE and a different relay UE, of the plurality of relay UEs, being below a threshold value; and a correlation factor for the channel between the relay UE and the destination node and another channel, of the second plurality of channels, corresponding to a channel between the different relay UE and the destination node being below a threshold value.

Aspect 13: The method of any of Aspects 8-12, wherein the signal strength measurement of the first report is a reference signal received power (RSRP) measurement for the channel between the source UE and the relay UE, and the channel estimate of the first report is for the channel between the source UE and the relay UE.

Aspect 14: The method of any of Aspects 8-13, wherein the signal strength measurement of the second report is a reference signal received power (RSRP) measurement for the channel between the relay UE and the destination node, and the channel estimate of the second report is for the channel between the relay UE and the destination node.

Aspect 15: The method of any of Aspects 8-14, wherein the at least one other channel of the first plurality of channels comprises every other channel of the first plurality of channels, and wherein the at least one other channel of the second plurality of channels comprises every other channel of the second plurality of channels.

Aspect 16: An apparatus for wireless communication at a device, comprising a processor; memory coupled with the processor; and instructions stored in the memory and executable by the processor to cause the apparatus to perform the method of one or more Aspects of Aspects 1-7.

Aspect 17: A device for wireless communication, comprising a memory and one or more processors coupled to the memory, the memory and the one or more processors configured to perform the method of one or more Aspects of Aspects 1-7.

Aspect 18: An apparatus for wireless communication, comprising at least one means for performing the method of one or more Aspects of Aspects 1-7.

Aspect 19: A non-transitory computer-readable medium storing code for wireless communication, the code comprising instructions executable by a processor to perform the method of one or more Aspects of Aspects 1-7.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-7.

Aspect 21: An apparatus for wireless communication at a device, comprising a processor; memory coupled with the processor; and instructions stored in the memory and executable by the processor to cause the apparatus to perform the method of one or more Aspects of Aspects 8-15.

Aspect 22: A device for wireless communication, comprising a memory and one or more processors coupled to the memory, the memory and the one or more processors configured to perform the method of one or more Aspects of Aspects 8-15.

Aspect 23: An apparatus for wireless communication, comprising at least one means for performing the method of one or more Aspects of Aspects 8-15.

Aspect 24: A non-transitory computer-readable medium storing code for wireless communication, the code comprising instructions executable by a processor to perform the method of one or more Aspects of Aspects 8-15.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 8-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
   a memory; and
   one or more processors coupled to the memory, the one or more processors configured to:
      receive, from a source user equipment (UE), a first report indicating at least one of a signal strength measurement or a channel estimate;
      receive, from a relay UE, a second report indicating at least one of a signal strength measurement or a channel estimate; and
      transmit, to the source UE and based at least in part on the first report and the second report, information identifying that the relay UE is one of a plurality of relay UEs selected for cooperative relaying of a communication from the source UE to a destination node, wherein:
         a channel between the source UE and the relay UE is one of a first plurality of channels comprising a channel between the source UE and each relay UE of the plurality of relay UEs, and a channel between the relay UE and the destination node is one of a second plurality of channels comprising a channel between each relay UE of the plurality of relay UEs and the destination node, and
         the plurality of relay UEs are selected based at least in part on at least one of a degree of correlation of the channel between the source UE and the relay UE with at least one other channel of the first plurality of channels or a degree of correlation of the channel between the relay UE and the destination node with at least one other channel of the second plurality of channels.

2. The network node of claim 1, wherein the destination node is the network node or a UE.

3. The network node of claim 1, wherein the one or more processors are further configured to:
   determine a set of candidate relay UEs for the cooperative relaying based at least in part on a routing table; and
   select the plurality of relay UEs from the set of candidate relay UEs.

4. The network node of claim 1, wherein the plurality of relay UEs are selected further based at least in part on at least one of signal strength measurements for the first plurality of channels or signal strength measurements for the second plurality of channels.

5. The network node of claim 1, wherein the relay UE is selected for the cooperative relaying further based at least in part on:
   a reference signal received power (RSRP) measurement for the channel between the source UE and the relay UE being above a first threshold value;
   an RSRP measurement for the channel between the relay UE and the destination node being above a second threshold value;
   a correlation factor for the channel between the source UE and the relay UE and another channel, of the first plurality of channels, corresponding to a channel between the source UE and a different relay UE, of the plurality of relay UEs, being below a third threshold value; and
   a correlation factor for the channel between the relay UE and the destination node and another channel, of the second plurality of channels, corresponding to a channel between the different relay UE and the destination node, being below a fourth threshold value.

6. The network node of claim 1, wherein the relay UE is selected for the cooperative relaying further based at least in part on:
- a reference signal received power (RSRP) measurement for the channel between the source UE and the relay UE being above a first threshold value;
- a sounding reference signal (SRS) power measurement for the channel between the relay UE and the destination node being above a second threshold value;
- a correlation factor for the channel between the source UE and the relay UE and another channel, of the first plurality of channels, corresponding to a channel between the source UE and a different relay UE, of the plurality of relay UEs, being below a third threshold value; and
- a correlation factor for the channel between the relay UE and the destination node and another channel, of the second plurality of channels, corresponding to a channel between the different relay UE and the destination node, being below a fourth threshold value.

7. The network node of claim 1, wherein the signal strength measurement of the first report is a reference signal received power (RSRP) measurement for the channel between the source UE and the relay UE, and the channel estimate of the first report is for the channel between the source UE and the relay UE.

8. The network node of claim 1, wherein the signal strength measurement of the second report is a reference signal received power (RSRP) measurement for the channel between the relay UE and the destination node, and the channel estimate of the second report is for the channel between the relay UE and the destination node.

9. The network node of claim 1, wherein the at least one other channel of the first plurality of channels comprises every other channel of the first plurality of channels, and
wherein the at least one other channel of the second plurality of channels comprises every other channel of the second plurality of channels.

10. A method for wireless communication performed by a network node, comprising:
- receiving, from a source user equipment (UE), a first report indicating at least one of a signal strength measurement or a channel estimate;
- receiving, from a relay UE, a second report indicating at least one of a signal strength measurement or a channel estimate; and
- transmitting, to the source UE and based at least in part on the first report and the second report, information identifying that the relay UE is one of a plurality of relay UEs selected for cooperative relaying of a communication from the source UE to a destination node, wherein:
  - a channel between the source UE and the relay UE is one of a first plurality of channels comprising a channel between the source UE and each relay UE of the plurality of relay UEs, and a channel between the relay UE and the destination node is one of a second plurality of channels comprising a channel between each relay UE of the plurality of relay UEs and the destination node, and
  - the plurality of relay UEs are selected based at least in part on at least one of a degree of correlation of the channel between the source UE and the relay UE with at least one other channel of the first plurality of channels or a degree of correlation of the channel between the relay UE and the destination node with at least one other channel of the second plurality of channels.

11. The method of claim 10, wherein the destination node is the network node or a UE.

12. The method of claim 10, further comprising:
- determining a set of candidate relay UEs for the cooperative relaying based at least in part on a routing table; and
- selecting the plurality of relay UEs from the set of candidate relay UEs.

13. The method of claim 10, wherein the plurality of relay UEs are selected further based at least in part on at least one of signal strength measurements for the first plurality of channels or signal strength measurements for the second plurality of channels.

14. The method of claim 10, wherein the relay UE is selected for the cooperative relaying further based at least in part on:
- a reference signal received power (RSRP) measurement for the channel between the source UE and the relay UE being above a first threshold value;
- an RSRP measurement for the channel between the relay UE and the destination node being above a second threshold value;
- a correlation factor for the channel between the source UE and the relay UE and another channel, of the first plurality of channels, corresponding to a channel between the source UE and a different relay UE, of the plurality of relay UEs, being below a third threshold value; and
- a correlation factor for the channel between the relay UE and the destination node and another channel, of the second plurality of channels, corresponding to a channel between the different relay UE and the destination node, being below a fourth threshold value.

15. The method of claim 10, wherein the relay UE is selected for the cooperative relaying further based at least in part on:
- a reference signal received power (RSRP) measurement for the channel between the source UE and the relay UE being above a first threshold value;
- a sounding reference signal (SRS) power measurement for the channel between the relay UE and the destination node being above a second threshold value;
- a correlation factor for the channel between the source UE and the relay UE and another channel, of the first plurality of channels, corresponding to a channel between the source UE and a different relay UE, of the plurality of relay UEs, being below a third threshold value; and
- a correlation factor for the channel between the relay UE and the destination node and another channel, of the second plurality of channels, corresponding to a channel between the different relay UE and the destination node, being below a fourth threshold value.

16. The method of claim 10, wherein the signal strength measurement of the first report is a reference signal received power (RSRP) measurement for the channel between the source UE and the relay UE, and the channel estimate of the first report is for the channel between the source UE and the relay UE.

17. The method of claim 10, wherein the signal strength measurement of the second report is a reference signal received power (RSRP) measurement for the channel between the relay UE and the destination node, and the channel estimate of the second report is for the channel between the relay UE and the destination node.

18. The method of claim 10, wherein the at least one other channel of the first plurality of channels comprises every other channel of the first plurality of channels, and
wherein the at least one other channel of the second plurality of channels comprises every other channel of the second plurality of channels.

19. A non-transitory computer-readable medium storing a set of instructions for wireless communication, the set of instructions comprising:
one or more instructions that, when executed by one or more processors of a network node, cause the network node to:
receive, from a source user equipment (UE), a first report indicating at least one of a signal strength measurement or a channel estimate;
receive, from a relay UE, a second report indicating at least one of a signal strength measurement or a channel estimate; and
transmit, to the source UE and based at least in part on the first report and the second report, information identifying that the relay UE is one of a plurality of relay UEs selected for cooperative relaying of a communication from the source UE to a destination node, wherein:
a channel between the source UE and the relay UE is one of a first plurality of channels comprising a channel between the source UE and each relay UE of the plurality of relay UEs, and a channel between the relay UE and the destination node is one of a second plurality of channels comprising a channel between each relay UE of the plurality of relay UEs and the destination node, and
the plurality of relay UEs are selected based at least in part on at least one of a degree of correlation of the channel between the source UE and the relay UE with at least one other channel of the first plurality of channels or a degree of correlation of the channel between the relay UE and the destination node with at least one other channel of the second plurality of channels.

20. The non-transitory computer-readable medium of claim 19, wherein the destination node is the network node or a UE.

21. The non-transitory computer-readable medium of claim 19, wherein the one or more instructions further cause the network node to:
determine a set of candidate relay UEs for the cooperative relaying based at least in part on a routing table; and
select the plurality of relay UEs from the set of candidate relay UEs.

22. The non-transitory computer-readable medium of claim 19, wherein the plurality of relay UEs are selected further based at least in part on at least one of signal strength measurements for the first plurality of channels or signal strength measurements for the second plurality of channels.

23. The non-transitory computer-readable medium of claim 19, wherein the relay UE is selected for the cooperative relaying further based at least in part on:
a reference signal received power (RSRP) measurement for the channel between the source UE and the relay UE being above a first threshold value;
an RSRP measurement for the channel between the relay UE and the destination node being above a second threshold value;
a correlation factor for the channel between the source UE and the relay UE and another channel, of the first plurality of channels, corresponding to a channel between the source UE and a different relay UE, of the plurality of relay UEs, being below a third threshold value; and
a correlation factor for the channel between the relay UE and the destination node and another channel, of the second plurality of channels, corresponding to a channel between the different relay UE and the destination node, being below a fourth threshold value.

24. The non-transitory computer-readable medium of claim 19, wherein the relay UE is selected for the cooperative relaying further based at least in part on:
a reference signal received power (RSRP) measurement for the channel between the source UE and the relay UE being above a first threshold value;
a sounding reference signal (SRS) power measurement for the channel between the relay UE and the destination node being above a second threshold value;
a correlation factor for the channel between the source UE and the relay UE and another channel, of the first plurality of channels, corresponding to a channel between the source UE and a different relay UE, of the plurality of relay UEs, being below a third threshold value; and
a correlation factor for the channel between the relay UE and the destination node and another channel, of the second plurality of channels, corresponding to a channel between the different relay UE and the destination node, being below a fourth threshold value.

25. The non-transitory computer-readable medium of claim 19, wherein the signal strength measurement of the first report is a reference signal received power (RSRP) measurement for the channel between the source UE and the relay UE, and the channel estimate of the first report is for the channel between the source UE and the relay UE.

26. The non-transitory computer-readable medium of claim 19, wherein the signal strength measurement of the second report is a reference signal received power (RSRP) measurement for the channel between the relay UE and the destination node, and the channel estimate of the second report is for the channel between the relay UE and the destination node.

27. The non-transitory computer-readable medium of claim 19, wherein the at least one other channel of the first plurality of channels comprises every other channel of the first plurality of channels, and
wherein the at least one other channel of the second plurality of channels comprises every other channel of the second plurality of channels.

28. An apparatus, comprising:
means for receiving, from a source apparatus, a first report indicating at least one of a signal strength measurement or a channel estimate;
means for receiving, from a relay apparatus, a second report indicating at least one of a signal strength measurement or a channel estimate; and
means for transmitting, to the source apparatus and based at least in part on the first report and the second report, information identifying that the relay apparatus is one of a plurality of relay apparatuses selected for cooperative relaying of a communication from the source apparatus to a destination node, wherein:
a channel between the source apparatus and the relay apparatus is one of a first plurality of channels comprising a channel between the source apparatus and each relay apparatus of the plurality of relay apparatuses, and a channel between the relay apparatus and the destination node is one of a second plurality of channels comprising a channel between each relay apparatus of the plurality of relay apparatuses and the destination node, and the plurality of relay apparatuses are selected based at least in part on at least one of a degree of correlation of the channel between the source apparatus and the relay apparatus with at least one other channel of the first plurality of channels or a degree of correlation of the channel between the relay apparatus and the destination node with at least one other channel of the second plurality of channels.

29. The apparatus of claim 28, wherein the destination node is the apparatus or a user equipment.

30. The apparatus of claim 28, further comprising:

means for determining a set of candidate relay apparatuses for the cooperative relaying based at least in part on a routing table; and means for selecting the plurality of relay apparatuses from the set of candidate relay apparatuses.

* * * * *